July 31, 1956  M. M. VAN DE WARKER  2,757,054
NYLON ROLLER BEARING ROLLER ASSEMBLY
Filed Oct. 7, 1954

Inventor
MERLE M. VAN DE WARKER
by Hill, Sherman, Meroni, Gross & Simpson
Attys.

2,757,054

NYLON ROLLER BEARING ROLLER ASSEMBLY

Merle M. Van De Warker, Eau Claire, Mich., assignor to Crawford Door Company, Detroit, Mich., a corporation of Michigan Application October 7, 1954, Serial No. 460,862

2 Claims. (Cl. 308—208)

The present invention relates to a new and improved form of a roller bearing assembly and to a method of assembling the same.

The primary object of this invention lies in the provision of a new and improved bearing element wherein the outer bearing race is formed of nylon.

Another object is to provide a new and improved bearing element or assembly wherein a nylon bearing housing, a cylindrical hub and roller elements are effectively retained in bearing forming relationship by a novel, resilient, solid or one-piece annular locking collar engaged in a peripheral groove formed on the hub.

A further object of this invention is the provision of a method of assembling a noiseless, rustproof, roller bearing roller assembly or element from a nylon bearing housing, a metal hub, roller elements and a nylon locking collar.

Other objects, features and advantages of the present invention will be readily apparent from the following detailed description of a preferred embodiment thereof taken in conjunction with the accompanying sheet of drawings, in which.

Figure 2:
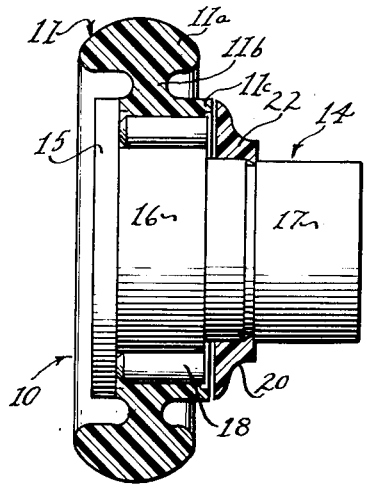
Figure 2 is a diametrical sectional view of Figure 1 with parts in elevation; and, Figure 3 is a telescopic view of Figure 2 illustrating the manner in which the bearing element of the instant invention is assembled.
Figure 1:
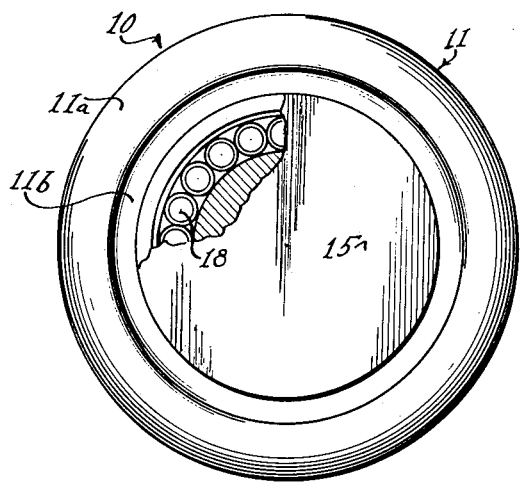
Figure 1 is a front elevational view of the roller bearing roller assembly or element of the instant invention with parts broken away.
Figure 3:
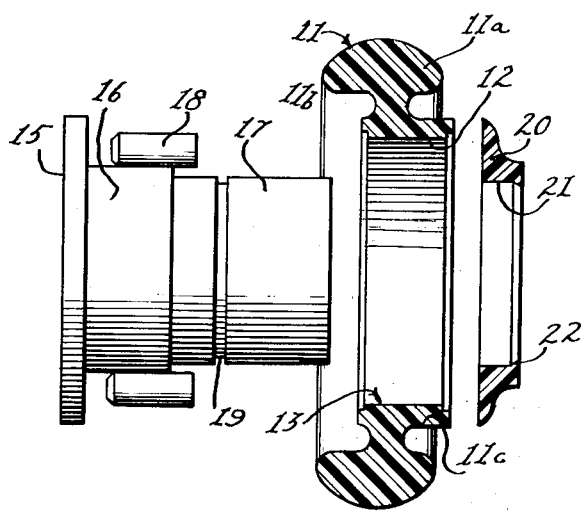

In accordance with the instant invention a bearing assembly or element, shown generally at 10, is provided with a rust-resistant, noiseless, and frictionless annular nylon bearing housing 11.

In the instant embodiment, the bearing housing 11 has a generally annular shape and includes an enlarged outer annular portion 11a, an integral annular land portion 11b, and a central cylindrical portion 11c. The entire housing 11 has the general configuration of a wheel and is particularly adapted for revolving movement in a channel or track. The central cylindrical portion 11c provides means defining cylindrical bore 12 therethrough. The inner periphery or wall of the cylindrical bore 12, as at 13 provides an outer race for anti-friction bearing elements.

A stepped cylindrical hub, shown generally at 14, preferably formed of metal, is disposed within the cylindrical bore 12 of the bearing housing 11 and projects axially therethrough. The outer diameter of the hub 14 is smaller than the diameter of the cylindrical bore 12 and is disposed within the bore 12 in concentric spaced relation therefrom. The hub 14 includes a radial flange or a flanged end portion 15 having a diameter greater than the diameter of the cylindrical bore 12, a cylindrical intermediate portion 16, and a terminal portion 17. The terminal portion 17 is in stepped relation to the intermediate portion 16 and has a smaller outer diameter than does the intermediate portion 16. The outer periphery of the intermediate portion 16 provides an inner race for anti-friction bearing elements.

A plurality of anti-friction bearing elements are disposed in circumferentially spaced relationship between the outer periphery of the intermediate portion 16 of the hub 14 and the wall of the cylindrical bore 12. In the instant embodiment such anti-friction roller elements preferably comprise roller bearings 18. It will, of course, be appreciated that the instant invention is not necessarily limited to the use of roller bearings. If desired, the structure could be modified to accommodate the use of ball bearings.

Means defining a peripheral groove 19 are provided on the terminal portion 17 of the hub 14 in generally parallel, axially spaced relationship to the flanged end portion 15.

An annular, resilient locking collar 20 is employed to hold the hub 14, the bearing housing 11 and the roller bearings 18 in bearing assembly-forming relationship. The locking collar 20 is preferably formed of a resilient or elastomeric synthetic material, such as nylon. The annular locking collar 20 has a cylindrical bore 21 formed therethrough and has an inner diameter substantially equal to the outer diameter of the terminal portion 17 of the hub 14. A radially inwardly tapering circumferential flange 22 is formed integral with the collar 20 contiguous with the outer face thereof and has a diameter smaller than the diameter of the bore 21. The flange 22 provides locking means for resiliently engaging the peripheral groove 19 formed in the terminal portion 17 of the hub 14.

The bearing assembly or element 10 is assembled in the following manner:

The hub 14 is inserted into the cylindrical bore 12 so that the flange end portion 15 abuts one side of the bearing housing 11 and the intermediate portion 16 of the hub 14 is in spaced concentric relation to the wall of the cylindrical bore 12. Contemporaneous with the positioning of the hub 14 within the cylindrical bore 12, or subsequent thereto, the roller bearings 18 are positioned in circumferentially spaced relationship between the outer periphery of the intermediate portion 16 and the wall of the cylindrical bore 12. When the hub 14 is thus positioned with the flanged end portion 15 abutting one side of the bearing housing 11, the peripheral groove 19 is caused to project axially beyond the opposite side of the bearing housing 11 from that side upon which the flanged end portion 15 is abutted. The resilient, annular locking collar 20 is then forced over the terminal portion 17 of the hub 14. The locking collar 20 is then advanced downwardly on the terminal portion 17 of the hub 14 until the annular locking flange 22 engages the peripheral groove 19 on the terminal portion 17. When such contact is made between the flange 22 and the groove 19, the resilient deforming pressure is relieved on the flange 22 thereby allowing the flange 22 to resiliently snap into locking engagement with the groove 19. When, as shown in Figure 2, the flange 22 is in locking engagement with the groove 19, the locking collar 20 projects radially beyond and circumjacent to the diameter of the cylindrical bore 12 and is adapted to act as a roller bearing retainer to prevent axial displacement of the bearings 18.

When the bearing element 10 is assembled, the annular locking collar 20 and the flanged end portion 15 of the hub 14 are adapted to coact on opposite sides of the bearing housing 11 to limit effectively axial movement of the hub 14 and the roller bearings 18.

The nylon bearing element 10 of the instant invention has many features and advantages which were not present in similar assemblies produced heretofore from metal.

The instant nylon roller bearing assembly is especially adaptable for use as a roller element in supporting and guiding the movement of folding overhead doors and similar structures as commonly used on garages and the like. In such use, the roller bearing assembly 10 is adapted to rotate and move in a channel or track. By employing a nylon bearing element the need for lubrication of the assembly is greatly minimized, if not eliminated. For, nylon in conjunction with metal roller bearings is substantially frictionless and lubricants are usually not necessary. In addition, the instant nylon roller bearing assemblies are rustproof and highly resistant to attack by chemical agents or the like. Nylon is also desirable in that it is noiseless as compared to conventional bearings produced of metal.

A distinct advantage of the instant bearing assembly over the prior structures is the use of the resilient annular locking collar 20 to retain the housing 11, hub 14 and roller bearings 18 in bearing forming relationship. Heretofore split metal snap rings have been employed for this purpose. Split metal rings are not too desirable, however, for there is always the danger of the ring slipping off the hub or otherwise becoming disengaged. In addition, a considerable amount of friction is developed between a metal snap ring and a roller bearing hub which may cause excessive wear on the parts.

By employing a solid, annular, nylon locking collar, however, these shortcomings of split metal snap rings are eliminated. The locking collar 20 is a solid annulus, and accordingly there is little danger of the collar becoming disengaged from the terminal portion of the hub. In addition, as noted previously, a nylon to metal contact is substantially frictionless; requires little if any lubrication; and, does not cause abrasive wearing of the metal parts.

It will be apparent to those skilled in the art that I have now provided a new and improved form of roller bearing assembly or element which may be conveniently assembled in a simple manner.

It will be understood that modifications and variations may be effected without departing from the scope of the novel concepts of the present invention.

I claim as my invention:

1. A roller assembly, which comprises an outer annular resilient housing having means defining a cylindrical bore therethrough, said housing being adapted for supported rotational movement within a track, a cylindrical hub including an integral radial flange on one end portion thereof and means defining an annular peripheral groove in axially spaced relation from the flange positioned in and projecting axially through said cylindrical bore in concentric spaced relation thereto, circumferentially spaced anti-friction elements disposed between the outer periphery of said hub and the wall of the cylindrical bore, and a solid elastomeric annular locking ring carried in association with said groove, said locking ring including a radially inwardly extending first annular flange portion having a diameter smaller than the diameter of said hub formed integral with the inner peripheral margin of said ring and contiguous with the outer face thereof adapted for elastic locking retention within said groove, and an integral radially outwardly extending second annular flange having a diameter greater than the diameter of said cylindrical bore formed contiguous with the inner face of said ring and being adapted to project radially circumjacently beyond the diameter of said cylindrical bore on one side of said housing in close axially spaced relation thereto for coaction with the radial flange on the hub disposed on the opposite side of said housing to limit axial movement of the hub and to prevent axial displacement of the anti-friction elements.

2. In a roller bearing roller assembly including an outer annular resilient housing having means defining a cylindrical bore therethrough, said housing being adapted for supported rotational movement within a track and a cylindrical hub including an integral radial flange on one end portion thereof and means defining an annular peripheral groove spaced axially from the flange positioned in and projecting axially through said bore in concentric spaced relation thereto, and having circumferentially spaced anti-friction elements disposed between the outer periphery of said hub and the wall of the cylindrical bore, the improvement which comprises providing a solid annular elastomeric locking ring carried in association with said groove, said locking ring including a radially inwardly extending first annular flange portion having a diameter smaller than the diameter of said hub formed integral with the inner peripheral margin of said ring and contiguous with the outer face thereof adapted for elastic locking retention within said groove, and an integral radially outwardly extending second annular flange having a diameter greater than the diameter of said cylindrical bore formed contiguous with the inner face of said ring adapted to project radially circumjacently beyond the diameter of said cylindrical bore on one side of said housing in close axially spaced relation thereto for coaction with the radial flange on the hub disposed on the opposite side of said housing to limit axial movement of the hub and to prevent axial displacement of the roller bearings.

References Cited in the file of this patent

UNITED STATES PATENTS

| 1,630,339 | Ganster | May 31, 1927 |
| 2,456,355 | Aber | Dec. 14, 1948 |
| 2,497,224 | Laure | Feb. 14, 1950 |
| 2,675,283 | Thomson | Apr. 13, 1954 |

FOREIGN PATENTS

| 566,081 | Great Britain | Dec. 13, 1944 |

OTHER REFERENCES

Product Engineering, February 1952, pages 119–123.